US008233566B2

(12) United States Patent
Birru

(10) Patent No.: US 8,233,566 B2
(45) Date of Patent: Jul. 31, 2012

(54) METHOD AND SYSTEM FOR DETECTING NARROWBAND SIGNALS USING A RECEIVER WITH A WIDEBAND FRONTEND

(75) Inventor: Dagnachew Birru, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 826 days.

(21) Appl. No.: 12/301,304

(22) PCT Filed: May 17, 2007

(86) PCT No.: PCT/IB2007/051897
§ 371 (c)(1),
(2), (4) Date: Nov. 18, 2008

(87) PCT Pub. No.: WO2007/135640
PCT Pub. Date: Nov. 29, 2007

(65) Prior Publication Data
US 2009/0185641 A1  Jul. 23, 2009

Related U.S. Application Data

(60) Provisional application No. 60/801,449, filed on May 18, 2006.

(51) Int. Cl.
*H04L 27/00* (2006.01)
(52) U.S. Cl. .................................. 375/316; 375/260
(58) Field of Classification Search .................. 375/140, 375/147, 130, 152, 285, 316–352; 455/179.1, 455/180.1, 180.2, 188.1, 188.2; 708/100, 708/200, 300, 314, 322, 402–405
See application file for complete search history.

(56) References Cited

U.S. PATENT DOCUMENTS

| 6,118,805 | A  | * | 9/2000 | Bergstrom et al. | ........... 375/132 |
| 2003/0035429 | A1 | * | 2/2003 | Mitra et al. | .................. 370/400 |

(Continued)

FOREIGN PATENT DOCUMENTS

WO  WO2005074154 A2  8/2005

OTHER PUBLICATIONS

Danijela Cabric et al., "Novel Radio Architectures for UWB, 60 GHz, and Cognitive Wireless Systems", ERASIP Journal on Wireless Communications and Networking, vol. 2006, Apr. 1, 2006, pp. 1-18, XP002456981 URL:http://www.hindawi.com/GetPDF.aspx?doI=10.1155/WCN/2006/17957>.

(Continued)

*Primary Examiner* — Sam K Ahn
*Assistant Examiner* — Janice Tieu
(74) *Attorney, Agent, or Firm* — Larry Liberchuk

(57) ABSTRACT

A system (100) and method (300) detect the presence of a narrowband signal having a bandwidth $\Delta F2$ in a wideband frequency channel having a bandwidth $\Delta F1 > \Delta F2$. The method (300) includes digitizing (310) a signal received in the frequency channel; transforming (320) the digitized signal into N digital frequency domain components; averaging (330) the power spectrum of the N digital frequency domain components over a plurality of samples; filtering (340) the averaged power spectrum of the N digital frequency domain components with a filter having M non-zero values spanning a bandwidth, $\Delta F3$, where N>M and $\Delta F1 > \Delta F3$; computing (350) a mean, $\mu_k$, a modified standard deviation, $\beta_k$, and a peak value, $P_{MAX}$ of the filtered, averaged power; and detecting (360) the presence of the narrowband whenever $P_{MAX} > (k_1 * \mu_k) + (k_2 * \beta_k)$, where $k_1$ and $k_2$ are selected to provide a probability of detection, a probability of missed detection, and a probability of false alarm.

14 Claims, 5 Drawing Sheets

U.S. PATENT DOCUMENTS

2005/0105588 A1    5/2005    Giannakis
2005/0232336 A1    10/2005   Balakrishnana
2006/0029142 A1*   2/2006    Arad ............................. 375/260

OTHER PUBLICATIONS

Jim Lansford, "Detect adn Avoid for MB-OFDM", IEEE Submission for IEEE802.19, No. 0034r0, Sep. 20, 2005, pp. 1-14, XP002456982, URL:http://www.jeee802.org/19/pub/2005/19-05-0034-00-0000-DAA_for_MB-OFDM.ppt>.

E. Visotsky et al., "On Collaborative Detection of TV Transmissions in Support of Dynamic Spectrum Sharing", New Frontiers in Dynamic Spectrum Access Networks, 2005, DYSPAN 2005, First IEEE International Symposium on Baltimore, MD, Piscataway, NJ IEEE, Nov. 8, 2005, pp. 338-345, XP010855131.

O.V. Gonzalez et al., "Narrowband Interference Detection in Multiband UWB Systems", Advances in Wired and Wireless Communication, 2005 IEEE/SARNOFF Symposium on Princeton, NJ, Apr. 18-19, 2005, Piscataway, NJ, Apr. 18, 2005, pp. 160-163, XP010793770.

Eric W. Weisstein, "Mean Deviation", Mathworld, Jun. 10, 2003, pp. 1-2, XP002456983 URL: http://mathworld.wolfram.com/MeanDeviation.html.

T Yucek et al., "Noise Plus Interference Power Estimation in Adaptive OFDM Systems", Vehicular Technology Conference, 2005, VTC, IEEE 61st Stockholm, NJ, IEEE, May 30, 2005, pp. 1278-1282, XP010855617.

Rahul Tandra Anant Saha!, "Fundamental Limits on Detection in Low SNR Under Noise Uncertainty", Wireless Networks, Communications and Mobile Computing, 2005 Int'l Conference on Maui, HI, Jun. 13-16, 2005, Piscataway, NJ, Jun. 13, 2005, pp. 464-469, XP010888002.

* cited by examiner

METHOD AND SYSTEM FOR DETECTING NARROWBAND SIGNALS USING A RECEIVER WITH A WIDEBAND FRONTEND

CROSS-REFERENCE TO RELATED APPLICATIONS

This invention pertains to a method and system of detecting the presence (or absence) of a signal, and more particularly to a method and system of detecting the presence of a narrowband signal in a wider frequency channel using a receiver with a wideband front-end.

With the proliferation of unlicensed wireless devices, detection of whether a certain frequency channel is occupied by other licensed or unlicensed devices is becoming a key ingredient of future unlicensed wireless devices. For example, in the case of an ultra-wide band (UWB) system, before a UWB transmitting device begins operation on a particular channel, it first must check to see if another UWB system, or some other authorized narrow-band system, is operating in the channel. Another example is a regional area network in the TV bands, an emerging standard that is being standardized by the IEEE802.22 group. In this case, the transmitting device must be able to detect other users that may be operating anywhere in the channel, such as wireless microphones that operate in the TV band.

Accordingly, it would be desirable to provide a system for detecting a narrowband signal using a receiver with a wideband front-end. It would be further desirable to provide a method of detecting a narrowband signal using a receiver with a wideband front-end. The present invention is directed to addressing one or more of the preceding concerns.

In one aspect of the invention, a system for detecting the presence of a narrowband signal having a bandwidth $\Delta F2$ in a wideband frequency channel having a bandwidth $\Delta F1 > \Delta F2$, comprises: a receiver front-end section adapted to receive a signal in a selected frequency channel having a bandwidth $\Delta F1$, to digitize the received signal, and to output a digitized signal; a time domain to frequency domain transformer adapted to transform the digitized signal output by the receiver front-end section into N digital frequency domain components spanning the frequency channel; a spectral averager adapted to average the power spectrum of the N digital frequency domain components over a plurality of samples, K; a filter adapted to filter the averaged power spectrum of the N digital frequency domain components with a filter having M non-zero values spanning a bandwidth, $\Delta F3$, where $N > M$ and $\Delta F1 > \Delta F3$; a statistics calculator computing a mean, $\mu_k$, a modified standard deviation, $\beta_k$, and a peak value, $P_{MAX}$ of the filtered, averaged power spectrum of the N digital frequency domain components; and a detector adapted to detect the presence in the frequency channel of a narrowband signal having a bandwidth $\Delta F2$ whenever $P_{MAX} > (k_1 * \mu_k) + (k_2 * \beta_k)$, where $k_1$ and $k_2$ are selected to provide a probability of detection, a probability of missed detection, and a probability of false alarm.

In another aspect of the invention, a method of detecting the presence of a narrowband signal having a bandwidth $\Delta F2$ in a wideband frequency channel having a bandwidth $\Delta F1 > \Delta F2$ comprises: digitizing a signal received in a frequency channel having a bandwidth $\Delta F1$; transforming the digitized signal into N digital frequency domain components spanning the frequency channel; averaging the power spectrum of the N digital frequency domain components over a plurality of samples, K; filtering the averaged power spectrum of the N digital frequency domain components with a filter having M non-zero values spanning a bandwidth, $\Delta F3$, where $N > M$ and $\Delta F1 > \Delta F3$; computing a mean, $\mu_k$, a modified standard deviation, $\beta k$, and a peak value, PMAX of the filtered, averaged power spectrum of the N digital frequency domain components; and detecting the presence in the frequency channel of a narrowband signal having a bandwidth $\Delta F2$ whenever $PMAX > (k1*\mu k)+(k2*\beta k)$, where k1 and k2 are selected to provide a probability of detection, a probability of missed detection, and a probability of false alarm.

In yet another aspect of the invention, a method of detecting the presence of a signal having a relatively narrow bandwidth $\Delta F2$ in a frequency channel having a relatively wide bandwidth $\Delta F1 > \Delta F2$ comprises: receiving a signal in a selected frequency channel having a bandwidth $\Delta F1$; averaging the power spectrum of the received signal over a time interval to produce an averaged power spectrum; applying the averaged power spectrum to a filter having a bandwidth $\Delta F3$, where $\Delta F1 > \Delta F3$, to produce a filtered, averaged, power spectrum; detecting the presence in the frequency channel of a narrowband signal having a bandwidth $\Delta F2$ whenever a ratio of a peak value in the filtered, averaged, power spectrum, to a selected one of: (a) a mean value of the filtered, averaged, power spectrum; (b) a modified standard deviation value of the filtered, averaged, power spectrum; and (c) a linear combination of a mean value and a modified standard deviation value of the filtered, averaged, power spectrum, exceeds a threshold.

Further and other aspects will become evident from the description to follow.

Figure 1:
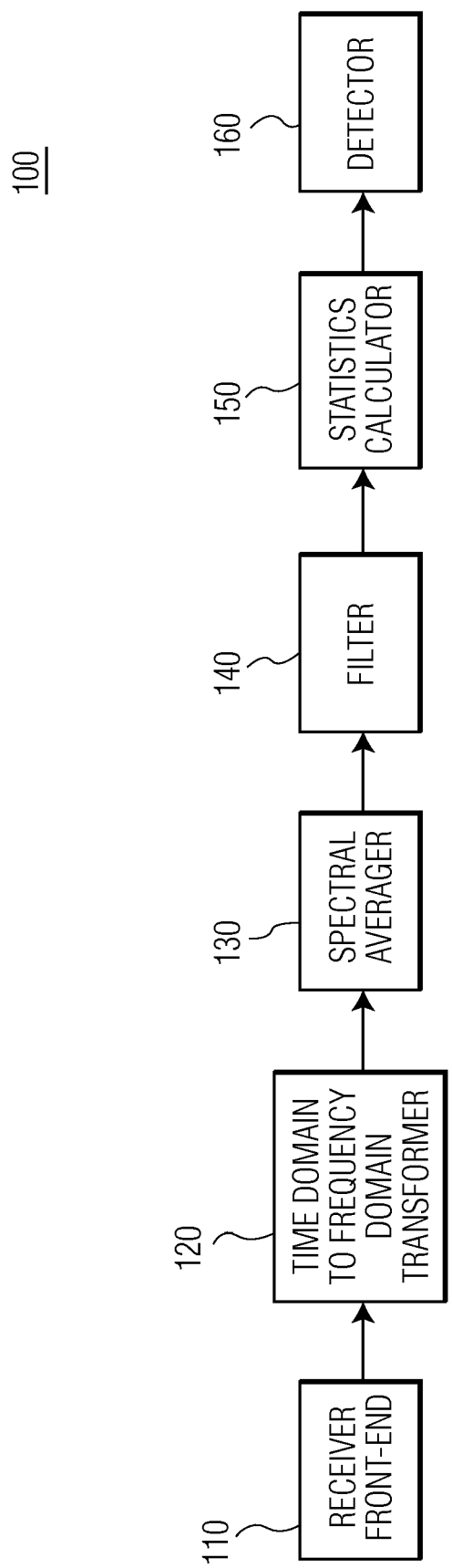
FIG. 1 shows a high-level diagram of one embodiment of a system for detecting the presence of a signal having a relatively narrow bandwidth in a frequency channel having a relatively wide bandwidth.
Figure 4:
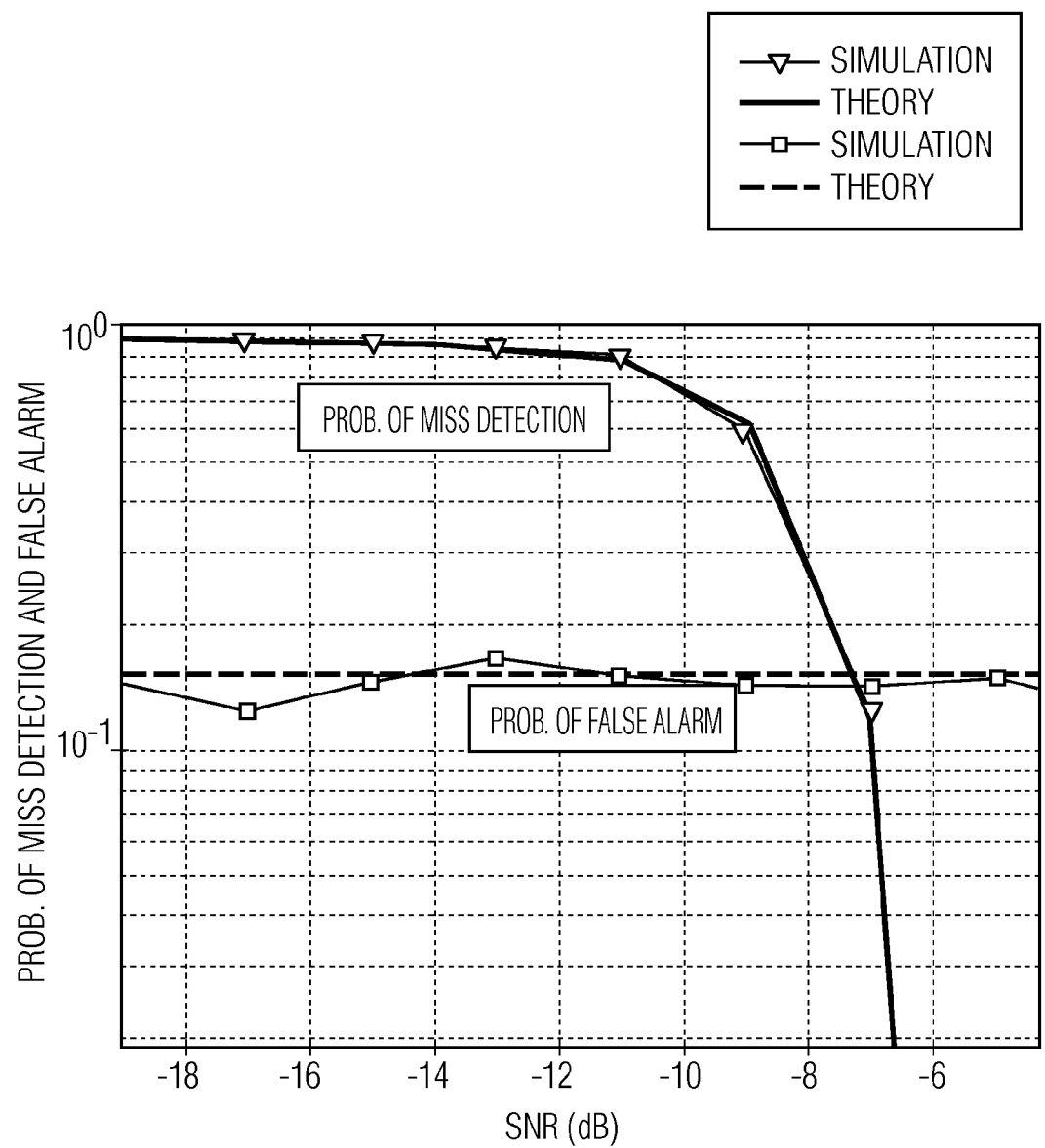
Figure 5:
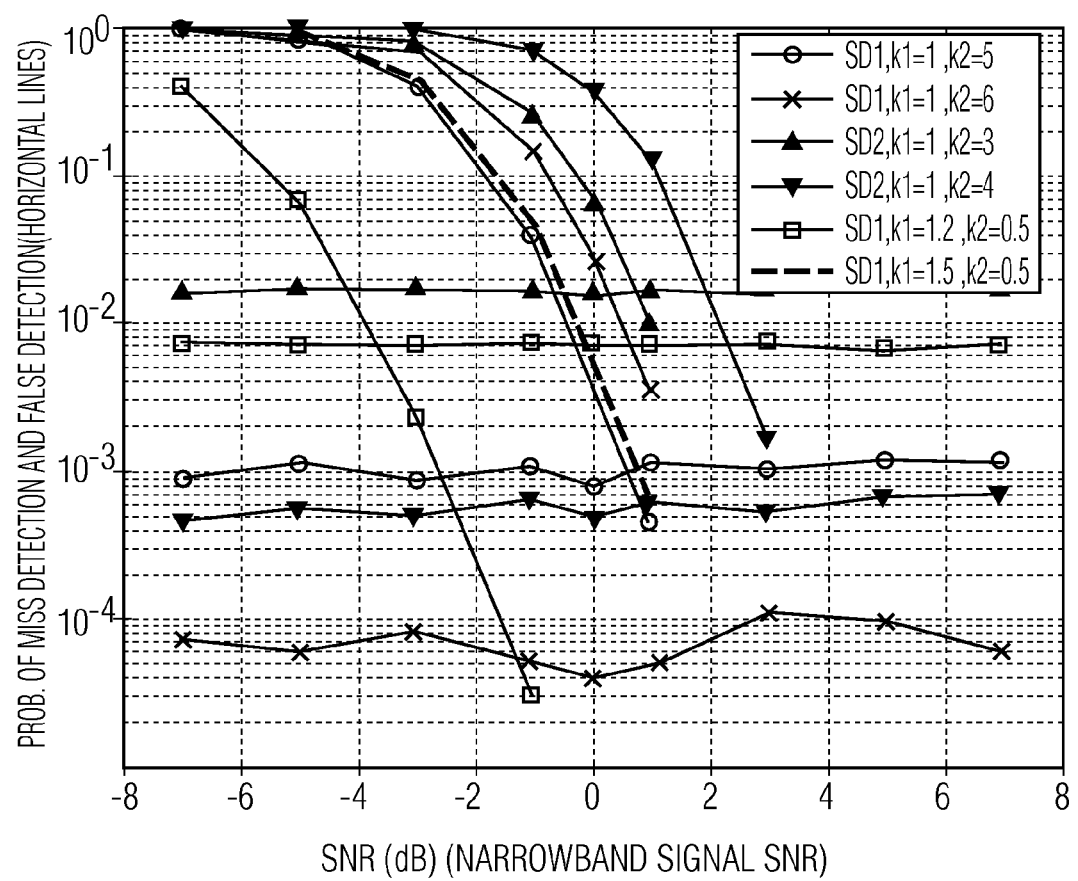
Figure 6:
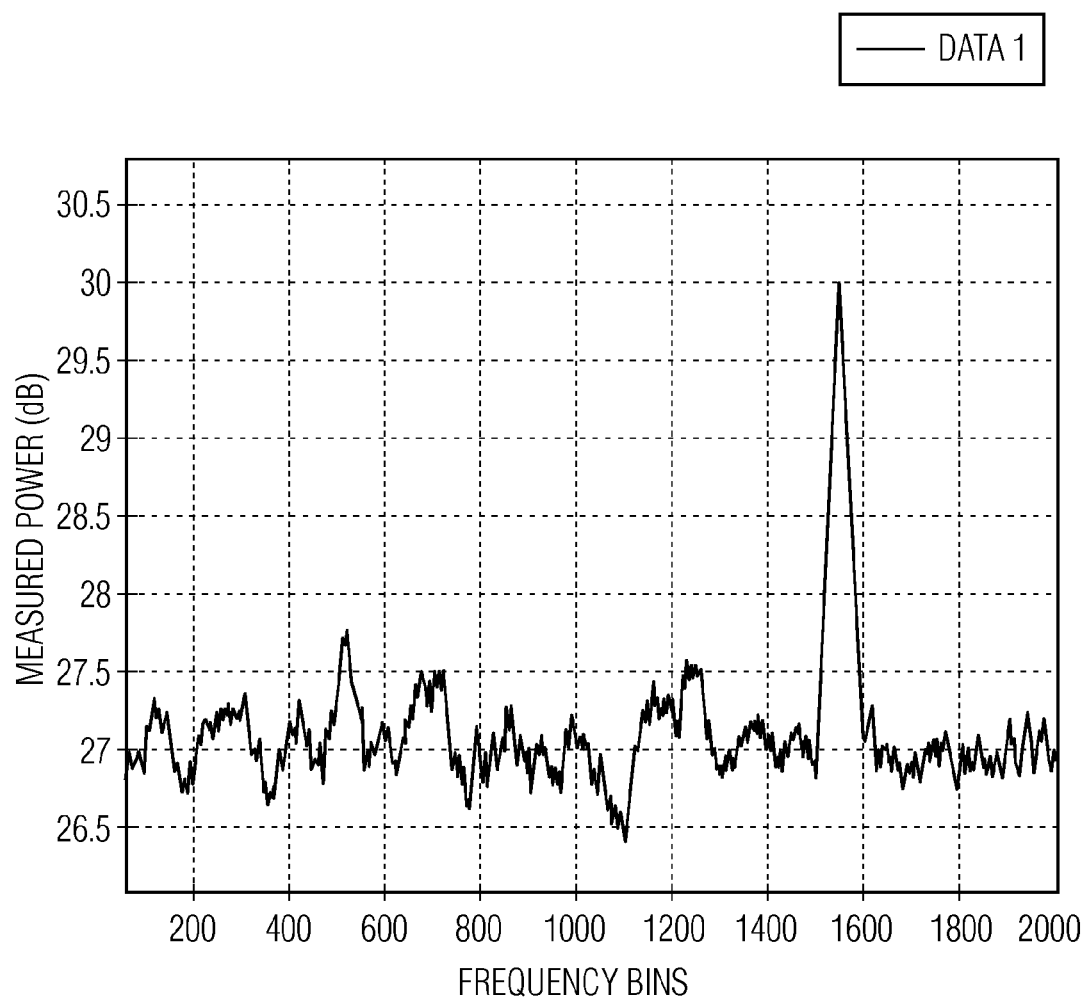

FIG. 4 compares the theoretical performance with the simulated performance of the system of FIG. 1;

FIG. 5 shows the expected performance of the system of FIG. 1 where the narrowband signal is passed through a Rayleigh fading channel;

FIG. 6 shows a simulated plot of the spectrum at the output of the filter of FIG. 1 when the received signal-to-noise ratio is 0 dB.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

FIG. 1 shows a high-level diagram of one embodiment of a system 100 for detecting the presence of a signal having a relatively narrow bandwidth, $\Delta F2$, in a frequency channel having a relatively wide bandwidth, $\Delta F1 > \Delta F2$. As will be appreciated by those skilled in the art, some or all of the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined in any physical implementation. System 100 includes receiver front-end section 110, a time domain to frequency domain transformer 120, a spectral averager 130, a filter 140, a statistics calculator 150, and a detector 160.

Figure 2:
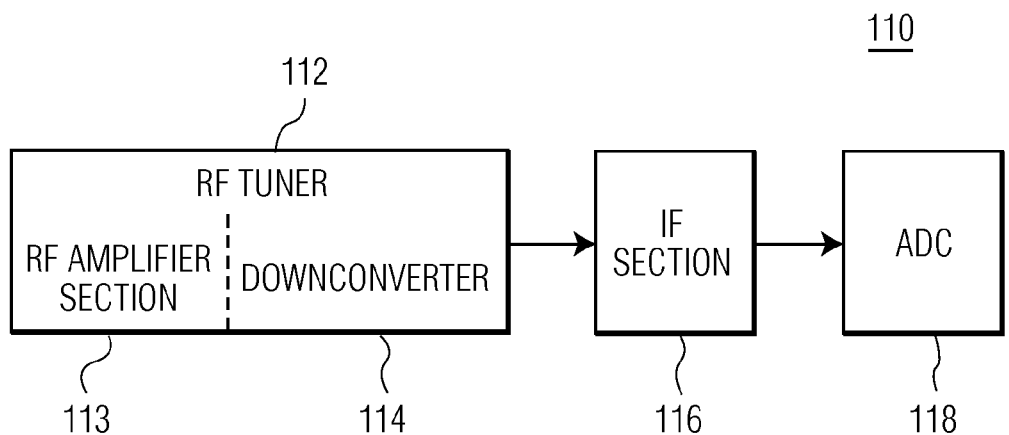
FIG. 2 illustrates one embodiment of a receiver front-end that may be employed in the system of FIG. 1.

FIG. 2 shows one embodiment of receiver front-end section 110, comprising a radio frequency (RF) tuner 112 spanning a plurality of frequency channels, an intermediate frequency (IF) section 116 coupled to the output of RF tuner 112, and an analog-digital-converter (ADC) 118 coupled to an output of IF section 116. RF tuner 112 comprises an RF amplifier section 113 and a downconverter 114 coupled to an output of RF amplifier section 113. RF amplifier section 113 may include one or more RF amplifiers and filters spanning a desired frequency band. Downconverter 114 may include a local oscillator and a mixer receiving the local oscillator signal and the output of RF amplifier section 113. Beneficially, the local oscillator is a programmable or tunable oscillator, such as a phase lock loop (PLL) frequency synthesizer, a direct digital frequency synthesizer, etc. Beneficially, IF section 116 includes at least one IF filter (e.g., a surface acoustic wave (SAW) filter) and an IF amplifier.

Operationally, downconverter 114 selectively downconverts a selected one of the plurality of frequency channels to the selected IF, wherein the desired frequency channel is selected by programming or tuning the local oscillator to a desired frequency such that the output of the mixer shifts the selected frequency channel to the IF frequency. The output of downconverter 114 (and therefore RF tuner 112) includes the selected frequency channel shifted to the IF frequency. In that case, IF section 116 eliminates the remaining, unselected, channels from the output of RF tuner 112. The output of IF section 116, comprises the selected frequency channel downconverted to the IF. ADC 118 then converts the analog signal output from IF section 116 into a digital signal which is the output of receiver front-end section 110.

Of course, FIG. 2 only shows one embodiment of receiver front-end section 110. In other embodiments, receiver front-end section may use double conversion, or—if the frequencies and technology permit—directly digitize and filter the selected channel at the received frequency.

Turning again to the components of FIG. 1, beneficially time domain to frequency domain transformer 120 is an N-point fast Fourier transformer, where the N points span the bandwidth of the selected frequency channel. Beneficially, spectral averager 130 is a digital signal processing circuit, which may include a microprocessor, a digital signal processor, etc. Beneficially, filter 140 is a digital filter having M non-zero values, where N>M.

An operation of the system 100 will now be explained.

Receiver front-end section 110 receives a signal from an antenna, selects a frequency channel having a bandwidth ΔF1, digitizes the received signal, and outputs a digitized signal, $r_n$. It should be understood that in this context that the term "received signal" is to be interpreted broadly as incorporating any combination of actual transmitted signal(s) and noise present at the receiver font-end, including the case where there is only noise and no actually transmitted signal. This is to be distinguished from the term "narrowband signal" which refers only to a signal that is specifically transmitted from some transmitting device.

Next, time domain to frequency domain transformer 120 performs an FFT operation on the input signal as follows $$Y(k, m) = \sum_{n=0}^{N-1} r_{n+N*k} e^{-j\frac{2\pi mk}{N}}$$

where $Y(k,m)$ is the $k^{th}$ block FFT output, $r_n$ is the received data, and N is the size of the FFT. Generally, $r_n$ is composed of the noise and the narrower-band signal to be detected. However, another wider-band signal may also be present.

After the FFT is performed, spectral averager 130 computes an averaged received power spectrum over K samples, $P(k,m)$, as follows:

$$P(k, m) = \frac{1}{K} \sum_{i=0}^{K-1} |Y(k+i, m)|^2$$

An alternative way to estimate the spectrum is to use first-order filters on each of the frequency bins of the FFT of time domain to frequency domain transformer 120, as:

$$P(k,m) = \delta P(k,m) + (1-\delta)|Y(k,m)|^2$$

where δ is a constant (forgetting factor).

The detection method employed by system 100 recognizes the principle that if a random variable is modeled as having a Gaussian distribution, then most of the samples fall within 3 standard deviations from the mean. Samples outside this are considered "outliers." For the present application, one may consider that, in the absence of an input signal, the signal measured by system 100 is noise. This noise follows the Gaussian distribution. However, in general, the power spectrum of the narrowband signal is not Gaussian. Thus, the standard "outlier" detection is not directly applicable. The following paragraphs provide theoretical background for the detection method that is employed.

The probability density function (pdf) for a random variable $y=x^2$ where x is a zero mean normal random variable (Gaussian) with variance $\sigma^2$ is given by:

$$f(y) = \frac{e^{-y/2\sigma^2}}{\sigma\sqrt{2\pi y}}, y > 0$$

From this, and using the fact that the probability density function of the sum of two random variables is the convolution of their probability density functions, we find the probability density function of $P(k,m)$ for K=1 to be the following:

$$f(P) = \frac{e^{-P/2\sigma^2}}{2\sigma^2},$$

Using the same principle, it can be shown that for K>1:

$$f(P) = \frac{\lambda(\lambda P)^{K-1}}{(K-1)!} e^{-\lambda P}$$

where $\lambda = K/(2\sigma^2)$. This probability density function is normally known as the Erlang density function. The cumulative distribution function (CDF) is also given by:

CDF=Γ(K,Pλ)

where Γ( ) is the incomplete Gamma function. The mean and variance of $f(P)$ are given as:

mean=$K/\lambda = 2\sigma^2$ and variance=$K/\lambda^2 = (2\sigma^2)^2/K$=mean$^2/K$.

Thus, more averaging (increasing K) makes the variance approach zero. If K is large, this density can be approximated with a Gaussian density function, however, as indicated above, the variance approaches zero, making it difficult to use the Gaussian assumption for detection.

From the CDF described above, it can be seen that tradeoffs that can be made in detection. If one defines the detection criteria as $P > 2\alpha\sigma^2$ where $\alpha$ is a threshold constant, then the probability of missed detection, the probability of correct detection, and the probability of false detection, can be described by:

Prob_miss=$\Gamma(K, K\alpha)^M$

Prob_detection=$1-\Gamma(K, K\alpha)^M$

Prob_false_alarm.=$1-\Gamma(K, K\alpha)^N$ where N is the size of the FFT and M is the number of frequency bins spanned by the narrowband signal. Given a certain performance criteria, one can then attempt to solve for the threshold constant and the required averaging time (K). However, a closed-form solution does not exist.

Turning again to FIG. 1, further spectral averaging of the averaged power spectrum from averager 130 is achieved by filtering P(k,m) with filter 140 having a bandwidth $\Delta F3$, where $\Delta F1 > \Delta F3$. Ideally, filter 140 should have a shape that matches the expected spectrum of the narrowband signal whose presence (or absence) within the frequency channel is being detected. In that case, filter 140 is a Wiener filter. However, in the presence of frequency selective multipath (e.g., Rayleigh fading) between the transmitter of the narrowband signal being detected and system 100, the expected spectrum is not known. Accordingly, filter 140 may be a simple rectangular filter with bandwidth $\Delta F3$. Beneficially, the filter bandwidth $\Delta F3$ is approximately equal to the bandwidth $\Delta F2$ of the narrowband signal whose presence (or absence) is being detected. That is, the system will perform better the closer the bandwidth $\Delta F3$ of filter 140 matches the bandwidth $\Delta F2$ of the narrowband signal whose presence (or absence) is to be detected. In the embodiment of FIG. 1, beneficially filter 140 is a digital filter of length N, with M non-zero values, where M is the number of frequency bins spanned by the narrowband signal to be detected. In a typical case (e.g., detecting a 350 kHz signal in a 6 MHz channel), M<N/10.

Next, statistics calculator 150 calculates some statistics of the filtered, averaged power spectrum. In particular, statistics calculator 150 calculates the mean and a modified standard-deviation (SD) of the filtered, averaged power spectrum. The conventional SD is biased in the presence of large narrower-band signals and thus is not a good statistic to use. Statistics calculator 150 calculates the mean, $\mu_k$, and the modified variance, $\beta_k$, as:

$$\mu_k = \sum_{m=0}^{N-1} P(k, m)$$

$$\beta_k = \sum_{m=0}^{N-1} |P(k, m) - \mu_k|$$

Making use of the probability functions described above, detector 160 detects the presence of a narrowband signal in the frequency channel when:

$\max(P(k,m)) > k_1\mu_k + k_2\beta_k$ where $k_1$ and $k_2$ are constants chosen to obtain desired performance criteria. That is, $k_1$ and $k_2$ are selected to produce a desired tradeoff between the probability of missed detection, the probability of correct detection, and the probability of false detection. Note that:

$$\mu_k = \sigma_1^2 + \frac{M}{N}\sigma_2^2$$

$$= \sigma_1^2\left(1 + \frac{M}{N}SNR\right)$$

where SNR is the signal-to-noise ration of the narrowband signal, $\sigma_1^2$ and $\sigma_2^2$ are the variance (power) of the background signal (noise) and the narrower-band signal respectively on a frequency bin basis (total input power is $N\sigma_1^2 + M\sigma_2^2$). Assuming that $k_2 = 0$, then:

$$\text{Prob\_miss} = \Gamma\left(K, Kk_1 \frac{\left(1 + \frac{M}{N}SNR\right)}{(1 + SNR)}\right)^M$$

$$\text{Prob\_detection} = 1 - \Gamma\left(K, Kk_1 \frac{\left(1 + \frac{M}{N}SNR\right)}{(1 + SNR)}\right)^M$$

$$\text{Prob\_false\_alarm.} = 1 - \Gamma\left(K, Kk_1 \frac{\left(1 + \frac{M}{N}SNR\right)}{(1 + SNR)}\right)^N$$

Figure 3:
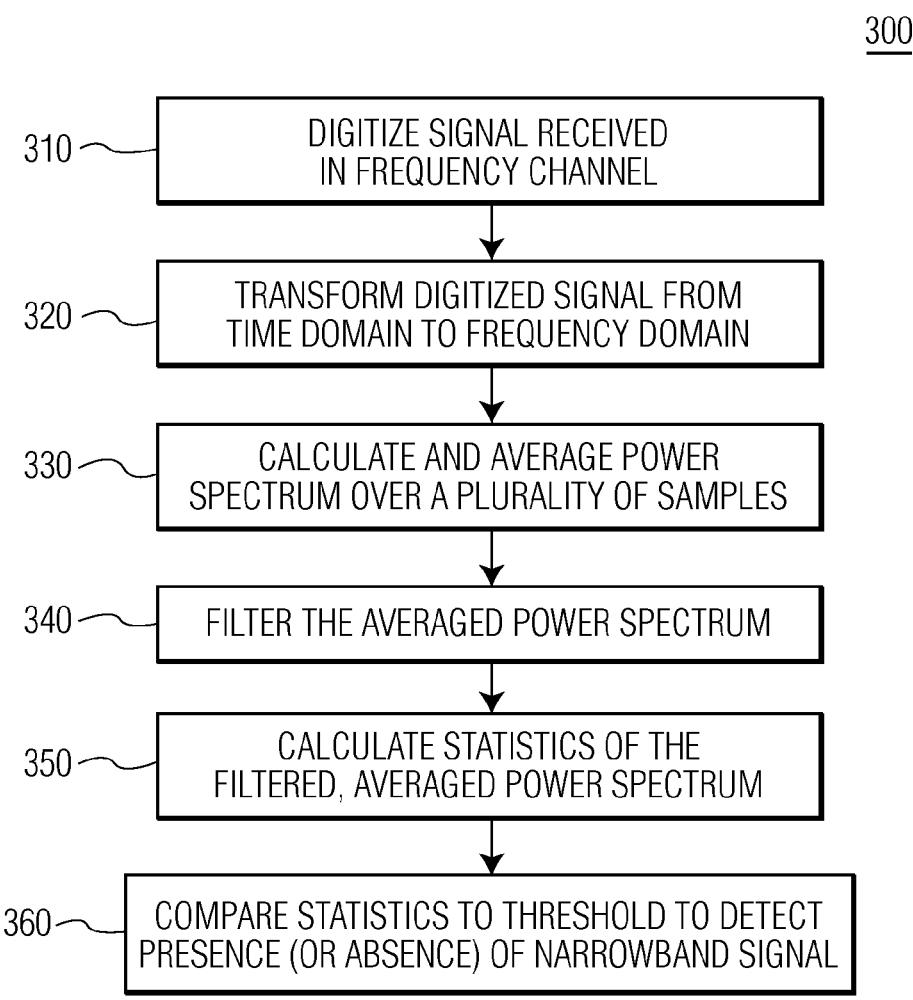
FIG. 3 is a flowchart explaining one embodiment of a method of detecting the presence of a signal having a relatively narrow bandwidth in a frequency channel having a relatively wide bandwidth.

FIG. 3 is a flowchart explaining one embodiment of a method 300 of detecting the presence of a signal having a relatively narrow bandwidth, $\Delta F2$, in a frequency channel having a relatively wide bandwidth, $\Delta F1$. In one embodiment, method 300 may be executed by a system such as system 100 of FIG. 1.

In a first step 310 of method 300, a signal received in a frequency channel having a bandwidth $\Delta F1$ is digitized.

Next, in a step 320, the digitized signal is transformed into N digital frequency domain components spanning the frequency channel. Beneficially, a fast Fourier transform is employed.

Then, in a step 330, the power spectrum of the N digital frequency domain components is averaged over a plurality of samples, K.

In a step 340, the averaged power spectrum of the N digital frequency domain components is filtered with a filter having M non-zero values spanning a bandwidth, $\Delta F3$, where N>M and $\Delta F1 > \Delta F3$. Beneficially, $\Delta F3$ is approximately equal to $\Delta F2$. Preferably, the filter is a Wiener filter. In a typical case (e.g., detecting a 350 kHz signal in a 6 MHz channel), M<N/10.

In a step 350, the mean, $\mu_k$, the modified standard deviation, $\beta_k$, and the peak value, $P_{MAX}$ of the filtered, averaged power spectrum of the N digital frequency domain components are calculated.

Finally, in a step 360, the presence in the frequency channel of the narrowband signal having a bandwidth $\Delta F2$ is detected whenever $P_{MAX} > (k_1 * \mu_k) + (k_2 * \beta_k)$, where $k_1$ and $k_2$ are selected to provide desired values for the probability of detection, the probability of missed detection, and the probability of false alarm.

Simulations of the system of FIG. 1 were performed to verify the assumptions made in deriving the equations above. FIG. 4 compares the theoretical performance with the simulated performance of the system of FIG. 1. In the example of FIG. 4, N=1024, M=50 and K=100. Also, $k_1$ is selected to be 1.4, and $k_2$ is set equal to zero.

FIG. 5 shows the expected (simulated) performance of the system of FIG. 1 where the narrowband signal is passed through a Rayleigh fading channel for various values of standard deviation, $k_1$, and $k_2$.

FIG. 6 shows a simulated plot of the spectrum at the output of the filter of FIG. 1 when the received signal-to-noise ratio is 0 dB. FIG. 6 illustrates how visual inspection of the spectrum clearly reveals the presence of the narrowband signal. This process can be automated by comparing the peak value of the filtered averaged power While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. A system for detecting the presence of a narrowband signal having a bandwidth $\Delta F2$ in a wideband frequency channel having a bandwidth $\Delta F1 > \Delta F2$, the system comprising:
a receiver front-end section adapted to receive a received signal in a selected frequency channel having a bandwidth $\Delta F1$, to digitize the received signal, and to output a digitized signal;
a time domain to frequency domain transformer adapted to transform the digitized signal output by the receiver front-end section into N digital frequency domain components spanning the frequency channel;
a spectral averager adapted to average the power spectrum of the N digital frequency domain components over a plurality of samples, K;
a filter adapted to filter the averaged power spectrum of the N digital frequency domain components with a filter having M non-zero values spanning a bandwidth, $\Delta F3$, where N>M and $\Delta F1 > \Delta F3$;
a statistics calculator computing a mean, $\mu_k$, a modified standard deviation, $\beta_k$, and a peak value, $P_{MAX}$ of the filtered, averaged power spectrum of the N digital frequency domain components; and
a detector adapted to detect the presence in the frequency channel of a narrowband signal having a bandwidth $\Delta F2$ whenever $P_{MAX} > (k_1 * \mu_k) + (k_2 * \beta_k)$, where $k_1$ and $k_2$ are selected to provide a probability of detection, a probability of missed detection, and a probability of false alarm.

2. The system of claim 1, wherein $\Delta F3$ is approximately equal to $\Delta F2$.

3. The system of claim 1, wherein the filter is a Wiener filter.

4. The system of claim 1, wherein the time domain to frequency domain transformer is a fast Fourier transformer.

5. The system of claim 1, wherein M<N/10.

6. The system of claim 1, wherein $\Delta F1$ is at least 6 MHz, and $\Delta F2$ is no more than 350 kHz.

7. The system of claim 1, wherein the receiver front-end section comprises:
a radio frequency (RF) tuner spanning a plurality of frequency channels, the RF tuner including,
an RF amplifier section; and
a downconverter coupled to an output of the RF amplifier section, the downconverter selectively converting one of the plurality of frequency channels to a selected intermediate frequency (IF);
an IF section coupled to an output of the downconverter; and
an analog-digital-converter connected to an output of the IF section.

8. The system of claim 7, wherein the RF tuner is adapted to select frequency channels signals in the VHF and UHF frequency bands.

9. A method of detecting the presence of a narrowband signal having a bandwidth $\Delta F2$ in a wideband frequency channel having a bandwidth $\Delta F1 > \Delta F2$, the method comprising:
digitizing a received signal in a frequency channel having a bandwidth $\Delta F1$;
transforming the digitized signal into N digital frequency domain components spanning the frequency channel;
averaging the power spectrum of the N digital frequency domain components over a plurality of samples, K;
filtering the averaged power spectrum of the N digital frequency domain components with a filter having M non-zero values spanning a bandwidth, $\Delta F3$, where N>M and $\Delta F1 > \Delta F3$;
computing a mean, $\mu_k$, a modified standard deviation, $\beta_k$, and a peak value, $P_{MAX}$ of the filtered, averaged power spectrum of the N digital frequency domain components; and
detecting the presence in the frequency channel of a narrowband signal having a bandwidth $\Delta F2$ whenever $P_{MAX} > (k_1 * \mu_k) + (k_2 * \beta_k)$, where $k_1$ and $k_2$ are selected to provide a probability of detection, a probability of missed detection, and a probability of false alarm.

10. The method of claim 9, wherein $\Delta F3$ is approximately equal to $\Delta F2$.

11. The method of claim 9, wherein the filter is a Wiener filter.

12. The method of claim 9, wherein transforming the digital signal comprises performing a fast Fourier transform on the digital signal.

13. The method of claim 9, wherein M<N/10.

14. The method of claim 9, wherein $\Delta F1$ is at least 6 MHz, and $\Delta F2$ is no more than 350 kHz.

* * * * *